United States Patent [19]

Ida

[11] Patent Number: 4,701,816
[45] Date of Patent: Oct. 20, 1987

[54] CAPSTAN FRICTION DRIVE APPARATUS OF TAPE RECORDER

[75] Inventor: Mitsuru Ida, Koshigaya, Japan
[73] Assignee: Sony Corporation, Tokyo, Japan
[21] Appl. No.: 596,454
[22] PCT Filed: Jul. 13, 1983
[86] PCT No.: PCT/JP83/00225
 § 371 Date: Mar. 14, 1984
 § 102(e) Date: Mar. 14, 1984
[87] PCT Pub. No.: WO84/00590
 PCT Pub. Date: Feb. 16, 1984

[30] Foreign Application Priority Data

Jul. 22, 1982 [JP] Japan ............................. 57-127967

[51] Int. Cl.$^4$ ............................................. G11B 5/008
[52] U.S. Cl. ................................... 360/96.4; 74/209; 242/201; 360/93
[58] Field of Search ............ 360/130.32, 90, 93, 360/96.1, 96.3, 96.4, 137, 130.31; 242/200–201; 310/74; 74/207–209, 212

[56] References Cited

U.S. PATENT DOCUMENTS

| | | | |
|---|---|---|---|
| 3,810,242 | 5/1974 | Ikeda | 360/96.3 |
| 3,932,892 | 1/1976 | Saito | 360/96.4 |
| 4,438,879 | 3/1984 | Rudi | 360/96.3 X |

FOREIGN PATENT DOCUMENTS

0011947 6/1941 Japan .
0036497 10/1975 Japan .

Primary Examiner—John H. Wolff
Assistant Examiner—David J. Severin
Attorney, Agent, or Firm—Lewis H. Eslinger

[57] ABSTRACT

The invention relates to a friction drive apparatus of a tape recorder which has a capstan and a friction wheel which is brought into slidable contact with a flywheel on which the capstan is mounted, the friction wheel serving to transmit a rotational force to the flywheel, the apparatus being constructed such that there are provided a support mechanism for pivotally supporting the friction wheel about a pivotal point which is eccentric with respect to a rotating shaft of the friction wheel, and biasing means for pivotally biasing the friction wheel about the pivotal point in a contact surface direction of the flywheel, the biasing means being arrranged to apply a predetermined initial contact pressure between the friction wheel and the flywheel, and a rotational direction of the friction wheel being determined such that a reaction force at the contact surface upon rotation of the friction wheel acts in a direction to cause pivotal movement of the friction wheel in the same direction as a direction toward which the biasing means acts, thereby increasing a contact pressure between the friction wheel and the flywheel above the initial contact pressure.

The support mechanism pivotally supports a motor through a pair of support members which are respectively disposed in front of and behind the motor, so that the friction wheel mounted on the rotating shaft of the motor is supported, the pair of support members being disposed in symmetrically eccentric positions with respect to the rotating shaft of the motor, and a line connecting the support members being drawn to pass through a center of gravity of the motor.

6 Claims, 14 Drawing Figures

CAPSTAN FRICTION DRIVE APPARATUS OF TAPE RECORDER

TECHNICAL FIELD

The present invention relates to a capstan friction drive apparatus of a tape recorder which has a capstan and a friction wheel which is brought into slidable contact with a flywheel on which the capstan is mounted, the friction wheel serving to transmit a rotational force to the flywheel.

BACKGROUND ART

In general, in a friction drive apparatus such as a disk drive system, a material such as rubber which has a considerably large friction coefficient is used to cover at least one of two opposing contact surfaces, so that a sufficient contact pressure acts between these two surfaces, thereby transmitting the rotational force through a sufficient friction force. However, when a friction drive apparatus is not used for a long period of time, a rubber surface which has been in tight contact with the opposing contact surface becomes locally recessed, since the rubber surface deforms over time. When the friction drive apparatus is rotated again under this condition, the local recess results in mechanical vibration. In particular, in electronic equipment such as a cassette tape recorder which is greatly affected by mechanical vibration, the deformation over time described above has the effect of degrading wow and flutter characteristic. In addition, the deformation causes noise and vibration.

On the other hand, when a friction wheel which is biased to apply a predetermined contact pressure is directly coupled to a motor shaft, the biasing force is affected by the self-weight of the motor. The contact pressure between the friction wheel and the flywheel varies in accordance with an orientation of the tape recorder. In this manner, the self-weight of the motor affects and degrades precision and reliability.

OBJECT OF INVENTION

The present invention has been made to overcome the conventional problems described above, and has as its object the provision of a capstan friction drive apparatus of a tape recorder, wherein a friction surface is not subjected to deformation over time (e.g., recess) even if the apparatus will not be used for a long period of time, by decreasing an initial contact pressure and at the same time a sufficient frictional force is provided during rotation, thereby transmitting the predetermined rotational force.

It is another object of the present invention to provide a capstan friction drive apparatus of a tape recorder, wherein a contact pressure between the friction wheel and the flywheel will not vary by a self-weight of a motor when the friction wheel is directly coupled to the motor shaft.

SUMMARY OF INVENTION

In order to achieve the above objects of the present invention, there is provided a friction drive apparatus of a tape recorder which has a capstan and a friction wheel which is brought into slidable contact with a flywheel on which the capstan is mounted, the friction wheel serving to transmit a rotational force to the flywheel, wherein there are provided a support mechanism for pivotally supporting said friction wheel about a pivotal point which is eccentric with respect to a rotating shaft of said friction wheel, and biasing means for pivotally biasing said friction wheel about said pivotal point in a contact surface direction of said flywheel, said biasing means being arranged to apply a predetermined initial contact pressure between said friction wheel and said flywheel, and a rotational direction of said friction wheel being determined such that a reaction force at said contact surface upon rotation of said friction wheel acts in a direction to cause pivotal movement of said friction wheel in the same direction as a direction toward which said biasing means acts, thereby increasing a contact pressure between said friction wheel and said flywheel above the initial contact pressure.

Said support mechanism pivotally supports a motor through a pair of support members which are respectively disposed in front of and behind said motor, so that said friction wheel mounted on said rotating shaft of said motor is supported, said pair of support members being disposed in symmetrically eccentric positions with respect to said rotating shaft of said motor, and a line connecting said support members being drawn to pass through the center of gravity of the motor.

In the capstan friction drive apparatus of a tape recorder which has the above-mentioned construction according to the present invention, the friction surface will not deform over time even if it is not used for a long period of time. At the same time, a sufficient frictional force acts between the friction wheel and the flywheel during rotation. Therefore, a predetermined rotational force can be properly transmitted.

On the other hand, when the friction wheel is directly coupled to the motor shaft, a contact pressure between the friction wheel and the flywheel which is conventionally influenced by the self-weight of the motor will not vary, irrespective of the orientation of the tape recorder.

The drawings show an embodiment of a tape drive mechanism of a cassette tape recorder to which the present invention is applied, in which FIGS. 9A and 9B are views showing the principle of the motor support structure, in which

DETAILED DESCRIPTION OF THE PREFERRED EMBODIMENT

An embodiment will be described with reference to the accompanying drawings in which the present invention is applied to a tape drive apparatus of a cassette tape recorder.

The tape drive apparatus will be schematically described with reference to FIG. 1. This tape drive apparatus is mounted on a backside surface of a mechanism chassis 1 which opposes a cassette mounting surface thereof. Therefore, in FIG. 1, a supply reel shaft 2, a take-up reel shaft 3 and a capstan 4 extend downward from the mechanism chassis 1. These drive shafts are supported by the mechanism chassis 1 and also extend upward therefrom.

A motor 5 is supported by a motor support member 6 disposed on the chassis 1. A motor pulley 8 fixed on a motor shaft 7 of the motor 5 presses against the lower portion of a capstan pulley 9, which also serves as a flywheel, fixed on the upper end of the capstan 4. The motor pulley 8 serves to drive the capstan 4 with a frictional force. A drive gear shaft 10 is vertically mounted on the upper surface of the chassis 1 at an intermediate position among the supply reel shaft 2, the take-up reel shaft 3 and the capstan 4. In addition, a conversion gear shaft 11 is vertically mounted on the upper surface of the mechanism chassis 1 at an intermediate portion between the drive gear shaft 10 and the supply reel shaft 2.

A capstan gear 12 comprising a wide face-width gear is mounted on the lower portion of the capstan pulley 9. First and second drive gears 13 and 14 are rotatably mounted on the drive gear shaft 10 such that a clutch mechanism (not shown) is interposed between the first and second drive gears 13 and 14 which are movable along the axial direction thereof. It should be noted that the second drive gear 14 is coupled to the first drive gear 13 through the clutch mechanism, so that the second drive gear 14 is coaxially rotated together with the first drive gear 13. During rotation of the second drive gear 14, the second drive gear 14 can be rotated or stopped in accordance with a load acting thereon.

A conversion gear 15 comprising a wide face-width gear is rotatably mounted on the conversion gear shaft 11 such that the conversion gear 15 can be moved along the axial direction thereof. This wide face-width gear 15 is biased by a compression spring (not shown) upward in FIG. 1. A supply reel shaft gear 16 comprising a wide face-width gear is mounted on the supply reel shaft 2 at an upper surface side of the mechanism chassis 1. First and second take-up reel shaft gears 17 and 18 are mounted on the take-up reel shaft 3 at an upper surface side of the mechanism chasses 1. surface side of t The first drive gear 13 is always meshed with the capstan gear 12 and can be axially moved to be selectively meshed with the conversion gear 15 and the first take-up reel shaft gear 17. Similarly, the conversion gear 15 is always meshed with the supply reel shaft gear 16 and can be axially moved. The second drive gear 14 is engaged with or disengaged from the second supply reel shaft gear 18 upon axial movement of the second drive gear 14.

On the other hand, an operation plate shaft 19 is vertically fixed on the upper surface of the mechanism chassis 1. A first operation plate 21 is mounted on the operation plate shaft 19 through a sleeve 20 which is axially slidable. A distal end 21a of the first operation plate 21 is engaged with an annular groove formed in a boss of the first drive gear 13. The first operation plate 21 can be vertically moved together with the first drive gear 13. A second operation plate 22 is disposed between the sleeve 20 of the operation plate shaft 19 and the first operation plate 21. The second operation plate 22 comprises a leaf spring. A distal end 22a of the second operation plate 22 is fitted outside the conversion gear shaft 11 and is brought into tight contact with the upper surface of the conversion gear 15.

A play button (reproduction button) 23 is constructed such that the conversion gear 15 is moved downward when the distal end 22a of the second operation plate 22 is moved downward. A fast forward button 24 serves to move the first and second operation plates 21 and 22 to their lowermost position, so that the first drive gear 13 is meshed with the first take-up reel shaft gear 17. A rewind button 25 serves to move the first operation plate 21 to an intermediate position such that the first drive gear 13 is meshed with the conversion gear 15. A stop button 26 serves to release the locked states of the operation buttons 23, 24 and 25 at the active positions thereof to return these buttons to their inactive positions.

Figure 1:
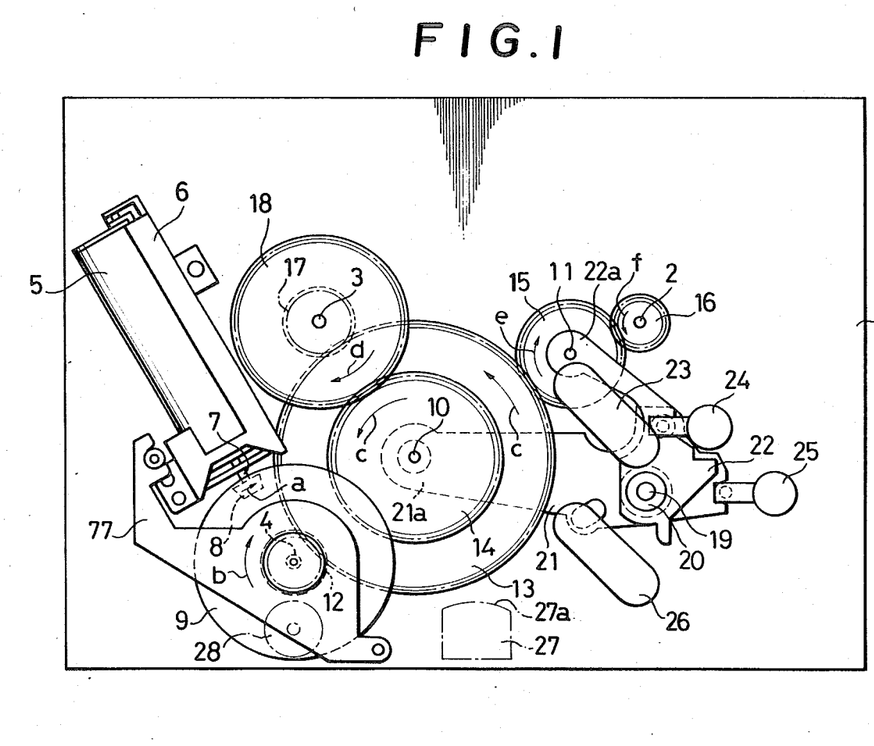
FIG. 1 is a schematic plan view showing a stop mode of the tape drive apparatus on a mechanism chassis.

Referring to FIG. 1, reference numeral 27 denotes a play head mounted on the back side of the mechanism chassis 1. A magnetic tape (not shown) travels past a front portion 27a of the play head 27, passes between a pinch roller 28 and the capstan 4, and is taken up by the take-up reel mounted on the take-up reel shaft 3.

The tape drive operation of the tape drive apparatus having the construction shown in FIG. 1 will be schematically described with reference to FIG. 1.

In the stop mode, the first and second drive gears 13 and 14 are located at their respective uppermost positions. The second drive gear 14 is meshed with the second take-up reel shaft gear 18, and the first drive gear 13 is located above the conversion gear 15 with a predetermined gap therebetween.

When a user presses the play button 23 in the stop mode, the conversion gear 15 is moved downward, so that the gap between the first drive gear 13 and the conversion gear 15 is increased. At the same time, the motor 5 is rotated in the direction indicated by arrow a in FIG. 1, so that the capstan 4 is rotated in the direction of arrow b. The take-up reel shaft 3 can be driven in the direction of arrow d through the capstan gear 12, the first drive gear 13, the clutch mechanism, the second drive gear 14 and the second take-up reel shaft gear 18, thereby setting the tape recorder in the play mode (FWD or forward tape travel state).

When the user depresses the fast forward button 24 in the stop mode, the first and second operation plates 21 and 22 are moved downward to their respective lowermost positions. Along with this downward movement, the first and second drive gears 13 and 14 are moved downward to their lowermost positions. The second drive gear 14 is disengaged from the second take-up reel shaft gear 18, and the first drive gear 13 is meshed with the first take-up reel shaft gear 17. It should be noted that the first drive gear 13 is moved together with the conversion gear 15 with the predetermined gap therebetween, and will not be meshed with the conversion gear 15. Therefore, the fast forward button 24 is locked at the active position, so that the take-up reel shaft 3 is rotated in the direction indicated by arrow d through the capstan gear 12, the first drive gear 13 and the first take-up reel shaft gear 17, thereby setting the tape recorder in the fast forward mode (FF or fast forward tape travel state).

When the user presses the rewind button 25 in the stop mode, the first operation plate 21 is moved halfway downward, and the first and second drive gears 13 and 14 are also moved to an intermediate position. The second drive gear 14 is disengaged from the second take-up reel shaft gear 18, but the first drive gear 13 does not become meshed with the first take-up reel shaft gear 17. Instead, the first drive gear 13 meshes with the conversion gear 15. Therefore, the rewind button 25 is located in the active position, so that the supply reel shaft 2 is rotated in the direction indicated by arrow f through the capstan gear 12, the first drive gear 13, the conversion gear 15 and the supply reel shaft gear 16, thereby setting the tape recorder in the rewind mode (tape REW or rewind travel state).

The motor support structure will now be described in detail with reference to FIGS. 2 to 7.

Figure 3:
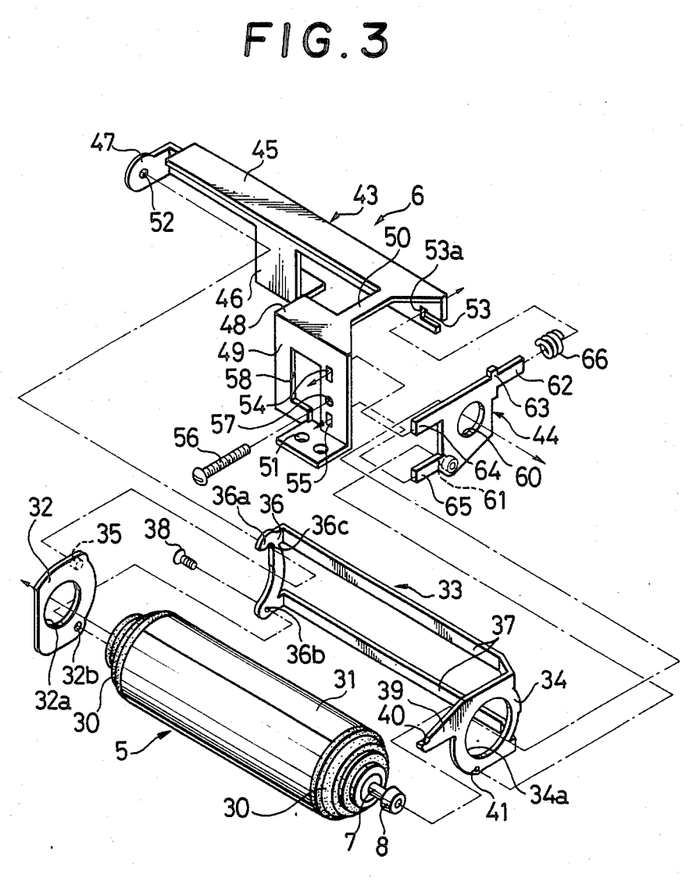
FIG. 3 is a developed perspective view thereof.
Figure 4:
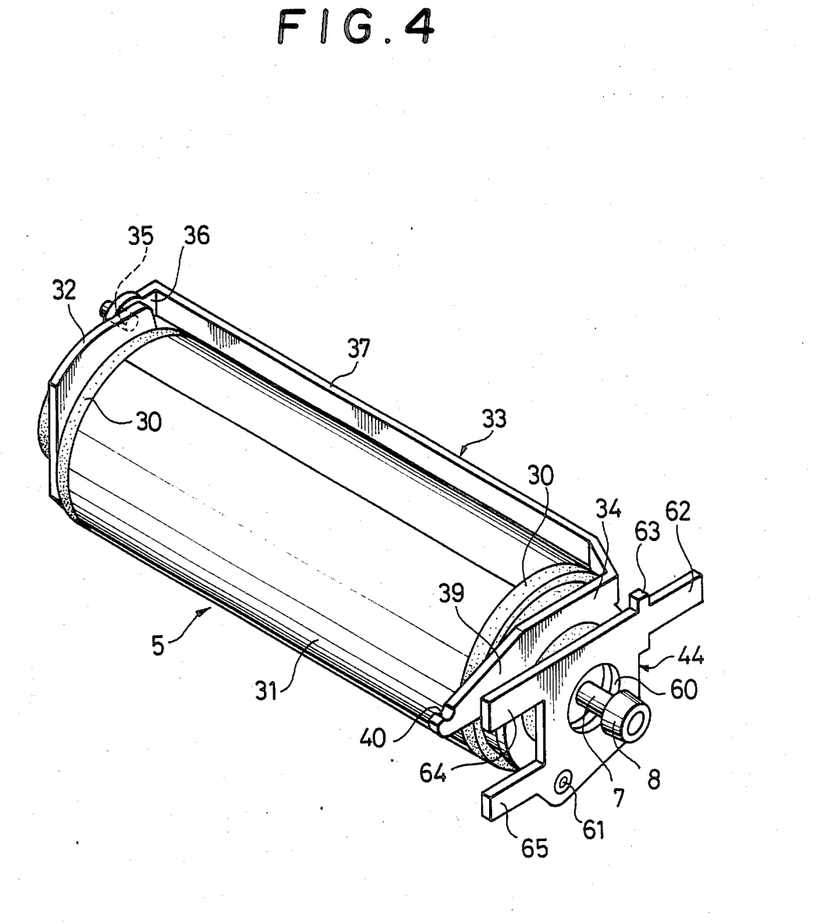
FIG. 4 is a perspective view showing a state removed the fixing member of the motor suppport member from FIG. 2.
Figure 5A:
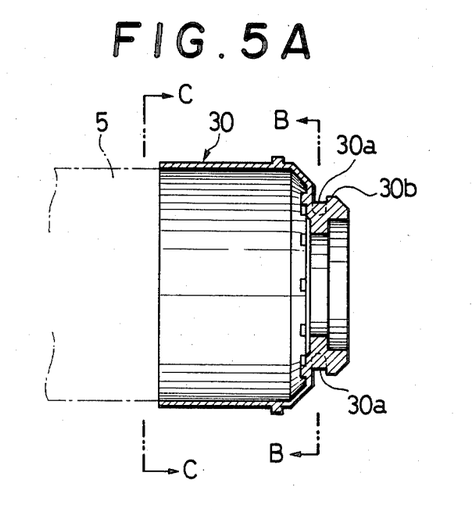
FIG. 5A is a longitudinal sectional view of a vibration-preventive rubber member of the motor.
Figure 5B:
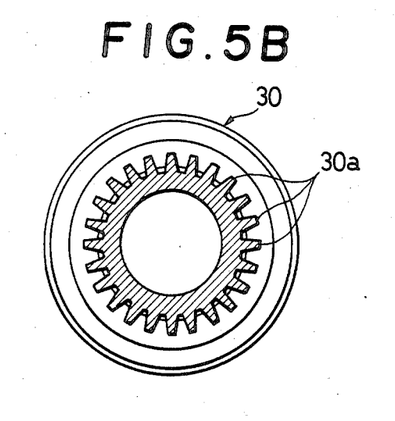
FIG. 5B is a sectional view thereof taken along the line B—B of FIG. 5A.
Figure 5C:
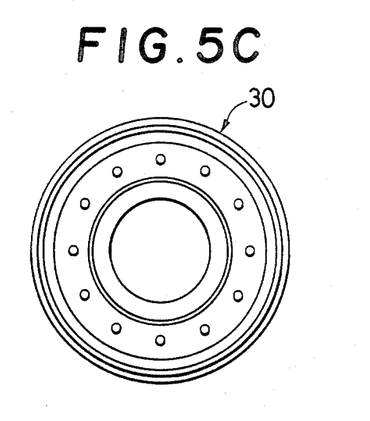
FIG. 5C is a sectional view thereof taken along the line C—C of FIG. 5A.

As shown in FIG. 3, cylindrical vibration-preventive rubber members 30 (FIGS. 5A-5C) are mounted on both ends of the motor 5, respectively, and are formed integrally with the motor 5. A shield plate 31 covers the outer surface of the motor 5. A rear side plate 32 of the motor 5 is integrally mounted on a boss portion of the corresponding rubber member 30 at a rear portion of the motor 5. Similarly, a front side plate 34 of a motor mounting member 33 is integrally mounted on a boss portion of the corresponding rubber member 30 at a front portion of the motor 5. The boss portion of each rubber member 30 comprises a toothed portion 30a formed radially along the peripheral surface of the boss, and a ring-like portion 30b. Through holes 32a and 34a formed at the central portions of the side plates 32 and 34, respectively, have a diameter slightly smaller than the outer diameter of the ring-like portion 30b. When the side plates 32 and 34 are respectively fitted around the toothed portions 30a, the portions 30a are deformed so that the side plates 32 and 34 are firmly fixed around the portions 30a. In addition, the ring-like portions 30b serve as collar portions, so that the side plates 32 and 34 will not be removed from the ring-like portions 30b, as if the side plates 32 and 34 were fitted in annular grooves, respectively. A fixing pin 35 is integrally formed at a predetermined position of the side plate 32 to be perpendicular with respect to the surface of the side plate 32. On the other hand, a rear connecting plate 36 which is parallel to the front side plate 34 is formed on the motor mounting member 33. The rear connecting plate 36 is integrally connected to the front side plate 34 by connecting members 37 to constitute a U-shaped structure. When the rear side plate 32 and the front side plate 34 are mounted on the rubber members 30, respectively, as described above, the rear connecting plate 36 is disposed outside the rear side plate 32. An engaging portion 36a having a semicircular engaging groove 36c engages with the fixing pin 35. By screwing a screw 38 through a through hole 36b of the connecting plate 36 and into a female thread hole 32b of the rear side plate 32, the rear side plate 32 is connected to the motor mounting member 33. As a result, as shown in FIG. 4, the motor 5 is integrally formed with these rigid members. The fixing pin 35 is substantially parallel to the motor shaft 7. An arm 39 extends to the left from the front side plate 34 to be substantially horizontal. A spring seat 40 is formed at the distal end of the arm 39. A through hole 41 is formed at an edge of the rear side plate 34.

As shown in FIG. 3, the motor support member 6 comprises a fixing member 43 which is fixed on the mechanism chassis 1, and an adjustment plate 44. The fixing member 43 has an integral construction constituted by a right horizontal member 45 bent perpendicularly downward, a right leg portion 46 for supporting the horizontal member 45 on the mechanism chassis 1, a substantially horizontal extending member 47 which extends to be perpendicular from the rear end of the horizontal member 45 toward the motor side, a short left horizontal member 48, a left leg portion 49 and a connecting member 50 for connecting the right and left horizontal members 45 and 48. The fixing member 43 supports the motor 5 together with the motor mounting member 33. The fixing member 43 is fixed at a predetermined position on the mechanism chassis 1 by screws extending through screw holes 51 of the leg portions 46 and 49. A through hole 52 is formed in the extending member 47 at a position corresponding to the fixing pin 35 of the rear side plate 32, so as to receive the pin 35. An L-shaped notch 53 is formed in the side surface of the front portion of the horizontal member 45. Two elongate holes 54 and 55 are vertically formed in the left leg portion 49. A screw hole 57 is formed in the left leg portion 49 at a middle portion between the two elongate holes 54 and 55, so as to receive an adjusting screw 56. A large opening 58 which receives the arm 39 or the like of the front side plate 34 is formed in the vicinity of the elongate holes 54 and 55 and the screw hole 57.

A through hole 60 is formed at the center of the adjustment plate 44. The motor shaft 7 and the motor pulley 8 extend through the through hole 60. A fixing pin 61 is integrally formed with the ajustment plate 44 to be substantially perpendicular to the surface of the side plate 34 at a position corresponding to the through hole 41 of the front side plate 34. The fixing pin 61 can be fitted in the through hole 41. A guide portion 62 which has a rectangular cross-sectional shape and extends horizontally is formed at the right portion of the adjustment plate 44. The guide portion 62 can be fitted in a longitudinally elongate hole 53a of the L-shaped notch 53 of the horizontal member 45, to be slidable in the elongate hole 53a. A projection 63 that functions as a spring seat is formed at a predetermined position of the upper portion of the guide portion 62. Two further guide portions 64 and 65 each of which has a rectangular sectional shape extend horizontally from the left portion of the adjustment plate 44 at positions corresponding to the elongate holes 54 and 55 of the leg portion 49, and can be slidably fitted in the elongate holes 54 and 55.

Figure 2:
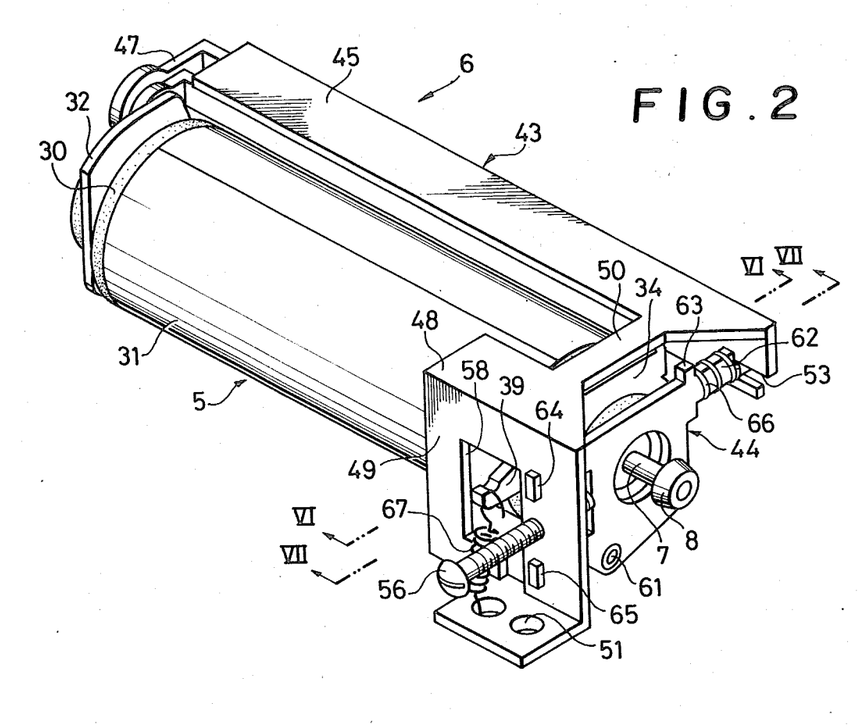
FIG. 2 is a perspective view showing a support state of a motor.

In order to mount the motor 5 on the motor support member 6, a compression coil spring 66 is fitted to the guide portion 62 of the adjustment plate 44, and then the guide portions 62, 64 and 65 are fitted in the corresponding elongate holes 53a, 54 and 55. The motor 5 together with the motor mounting member 33 is inserted in a space defined by the adjustment plate 44 and the extending member 47 of the fixing member 43 of the motor support member 6. By utilizing the elastic force of the extending member 47, the fixing pins 35 and 61 are respectively fitted in the corresponding through holes 52 and 41. The adjusting screw 56 is screwed into the screw hole to adjust the motor pulley 8 to a predetermined position. On the other hand, a predetermined tension coil spring 67 is hooked between the spring seat 40 of the arm 39 of the front side plate 34 and the through holes 51 of the leg portion 49. Thus, assembly can be performed to obtain a unit as shown in FIG. 2. In this case, the fixing pin 61 is substantially parallel to the motor shaft 7. The motor 5 is integrally assembled together with the motor mounting member 33, so that the motor 5 is pivotally mounted on the motor support member 6 through the fixing pins 35 and 61. In addition, the motor 5 is biased by the tension coil spring 67 to be pivoted about the fixing pins 35 and 61.

Figure 9A:
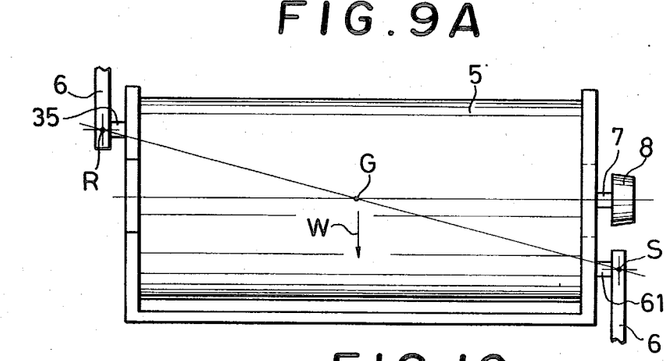
FIG. 9A is a side view thereof and FIG. 9B is a front view thereof.
Figure 9B:
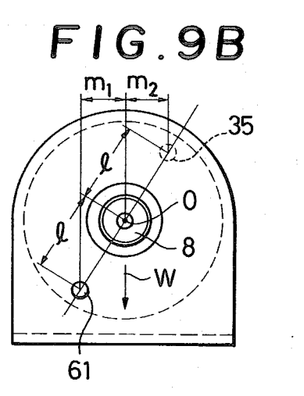

The fixing pins 35 and 61 oppose each other and are inclined at an angle of about 45 to the right and left with respect to a motor axis 0, as shown in FIG. 9B. The fixing pins 35 and 61 are disposed such that each is spaced a distance l away from the axis 0.

Figure 8:
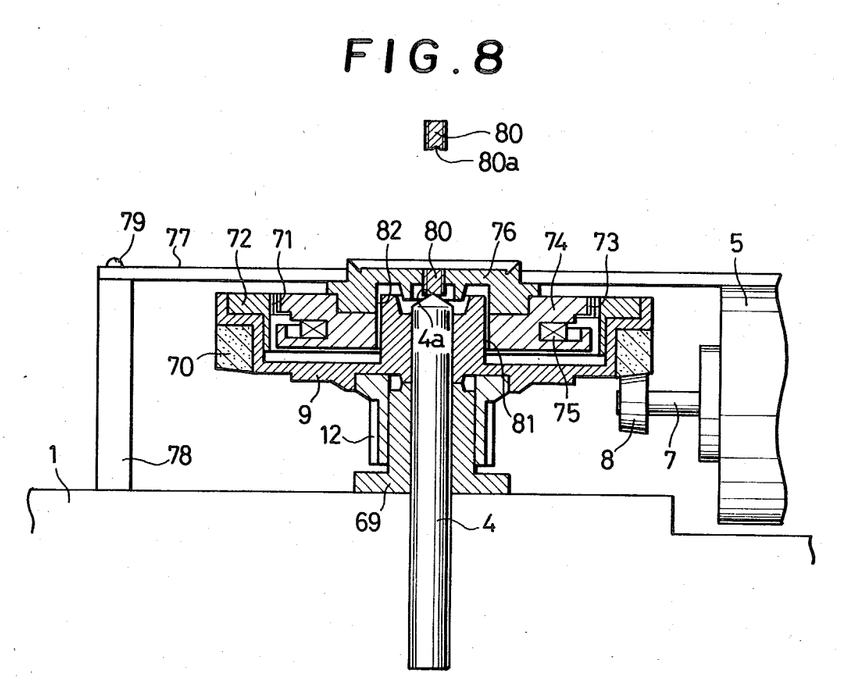
FIG. 8 is a longitudinal sectional view of a capstan pulley.

The capstan pulley 9 will now be described with reference to FIG. 8.

The capstan 4 is supported by a bearing 69 fixed on the mechanism chassis 1, and is rotatable. The capstan pulley 9 having a disk shape with an annular groove at an intermediate portion thereof, is fixed at the upper end of the capstan 4 as described before. The capstan gear 12 having a wide face-width is fixed at the lower portion of the capstan 4. The capstan gear 12 is supported by the outer surface of the bearing 69 and is rotated together with the capstan pulley 9. An annular rubber member 70 is fixed on the lower surface side of the peripheral surface of the capstan pulley 9 and has a contact surface of a moderately conical shape. The contact surface of the motor pulley 8 which is brought into tight contact with the conical contact surface of the annular rubber member 70 also comprises a conical shape of the same angle. An annular magnetic rotor member 72 is fixed in the annular recess of the capstan pulley 9, and has a plurality of radial teeth 71 formed in its inner surface 9 at equal intervals.

A magnetic stator member 74 is disposed in an inner part of the annular recess and has a plurality of teeth 73 formed in its outer surface and which are spaced a predetermined distance apart from the teeth 71 of the rotor member 72 so as to oppose the teeth 71 of the rotor member 72. The teeth 73 have the same pitch as that of the teeth 71. An annular magnet 75 is disposed in the stator memeber 74 such that, for example, the upper surface of the magnet 75 constitutes the N pole and the lower surface thereof constitutes the S pole, so as to form a magnetic path between the rotor member 72 and the stator member 74. Therefore, a change in magnetic flux between the irregular pattern formed by the teeth 71 of the rotor side during rotation and the irregular pattern formed by the teeth 73 is extracted as an output signal. Therefore, velocity detection based upon the output of a frequency generator can be performed. It should be noted that the stator member 74 is integrally coupled to a support plate 77 (whose shape is illustrated in FIG. 1) through a center member 76, and is fixed by a screw 79 to a column 78 extending vertically upward from the mechanism chassis 1.

Reference numeral 80 denotes a pivot bearing which is made of teflon or the like, which has a male thread on its outer surface, and which has a conical recess 80a at the center thereof. The pivot bearing 80 is supported at the recess 80a on a conical top portion 4a of the capstan 4 to hold the stator side at a proper position with respect to the axis of the capstan 4. Therefore, a space between the teeth 71 of the rotor member 72 and the teeth 73 of the stator member 74 is uniform over the entire peripheral portions thereof. In order to mount the stator member, an inner surface 82 of the circular recess of the stator member is located on an outer surface 81 of a circular boss which is located at the center of the capstan pulley 9. Thereafter, the support plate 77 is set by the screw 79. When the pivot bearing 80 is then screwed in, the conical recess 80a of the pivot bearing 80 is screwed down along conical top portion 4a of the capstan 4, so that the axis of the pivot bearing 80 can coincide with the axis of the capstan 4. Therefore, the stator member 74 mounted integrally with the pivot bearing 80 can be fine-adjusted together with the center member 76 and the support plate 77, to be aligned with the axis of the capstan 4.

The operation and effect of the motor and the motor pulley which are supported as described above will now be described.

Referring to FIGS. 9A and 9B, the front portion of the motor 5 (including the motor mounting member 33 mounted together with the motor 5) is pivotally supported by the fixing pin 61, and the rear portion of the motor 5 is pivotally supported by the fixing pin 35. When loads caused by the self-weight W of the motor 5 which are applied to the fixing pins 61 and 35 are defined as $W_1$ and $W_2$, the front portion of the motor 5 is pivoted clockwise by a moment $W_1 m_1$, and the rear portion of the motor 5 is pivoted counterclockwise by a moment $W_2 m_2$. The fixing screws 35 and 61 lie opposite each other on a line inclined with respect to the axis 0 of the motor, and are equidistantly spaced by the distance l from the axis 0, so that the relation $m_1 = m_2$ is established. A line connecting support points R and S of the pins 35 and 61 supported by the motor support member 6 passes through substantially the center of gravity of the motor 5 in FIG. 9A, so that the relation $W_1 = W_2 = W/2$ is established. Since $W_1 m_1 = W_2 m_2$, the motor 5 will not rotate due to its self-weight. However, since the motor 5 is pivotally supported by the fixing pins 35 and 61, the motor 5 can be pivoted about the pins 35 and 61.

Figure 6:
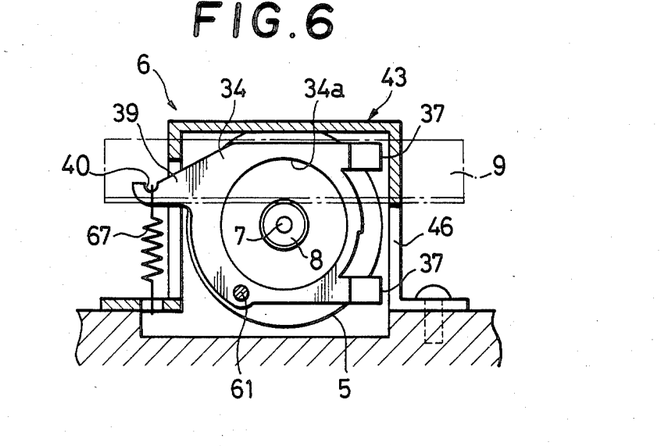
FIG. 6 is a sectional view taken along the line VI—VI of FIG. 2.
Figure 10:
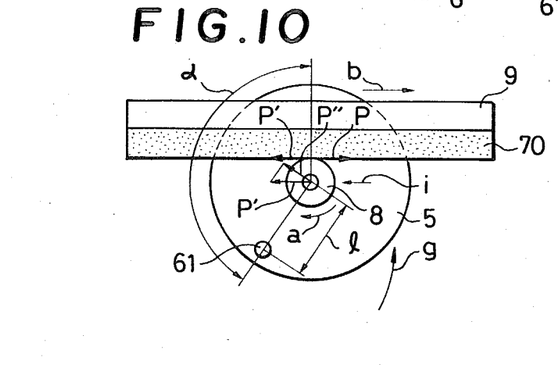
FIG. 10 is a front view showing a drive section when viewed from the motor pulley side so as to explain the principle of the friction drive section.

The friction driving by the motor pulley 8 will now be described. As shown in FIG. 6, the arm 39 of the front side plate 34 is biased downward by the tension coil spring 67. Therefore, the motor 5 and hence the motor pulley 8 is pivoted about the pivot point 61 in the direction indicated by arrow g, as shown in FIG. 10. The motor pulley 8 is urged against the rubber member 70 of the capstan pulley 9. Under this initial contact pressure, when the motor pulleY 8 is rotated in the direction of arrow a, as shown in FIG. 1, the motor pulley 8 causes the capstan pulley 9 to rotate in the direction of arrow b by the rotational force P corresponding to the initial contact force. A reaction force P' corresponding to the rotational force P acts on the contact surface of the motor pulley 8 in the direction of arrow i opposite to the direction of arrow b. The reaction force P' acts to move the motor shaft 7 in the direction of arrow i, so that the motor pulley 8 is pivoted about the pivot point 61 by a moment comprising a product P".l of the tangential component of P" and the radius l in the direction of arrow g, as shown in FIG. 10. By this pivotal force, the motor pulley 8 is urged against the capstan pulley 9 at a contact pressure greater than the initial contact pressure. As a result, the rotational force P is further increased. When the frictional force increases in the process described above so as to become equal to a load of the capstan pulley 9, the capstan pulley 9 is started, and normal operation is performed.

The initial contact pressure can be as low as a minimum force required to prevent slippage of the motor pulley 8 with respect to the capstan pulley 9. During operation, the motor pulley 8 is automatically urged against the contact surface of the capstan pulley 9, so that the contact pressure is gradually increased, and thus the capstan pulley 9 is driven in accordance with the contact pressure corresponding to the load. For example, the conventional cassette tape recorder of similar type requires a contact pressure of 90 to 100 g. However, the cassette tape recorder of the present invention only requires an initial contact pressure of 20 to 30 g. An angle α in FIG. 10 preferably falls within the range of 120° to 150°.

Furthermore, in this embodiment, since the motor is supported so as not to pivot due to its self-weight, the initial contact pressure is not influenced by the self-weight of the motor. For this reason, a highly precise initial contact pressure can be given and can be minimized.

Figure 7:
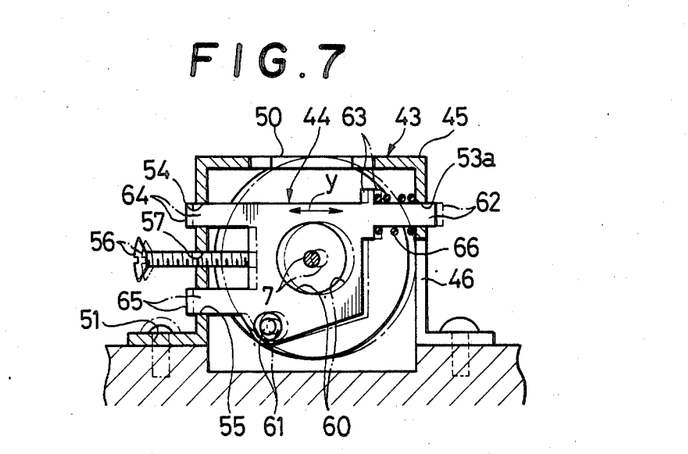
FIG. 7 is a sectional view taken along the line VII—VII of FIG. 2.
Figure 11:
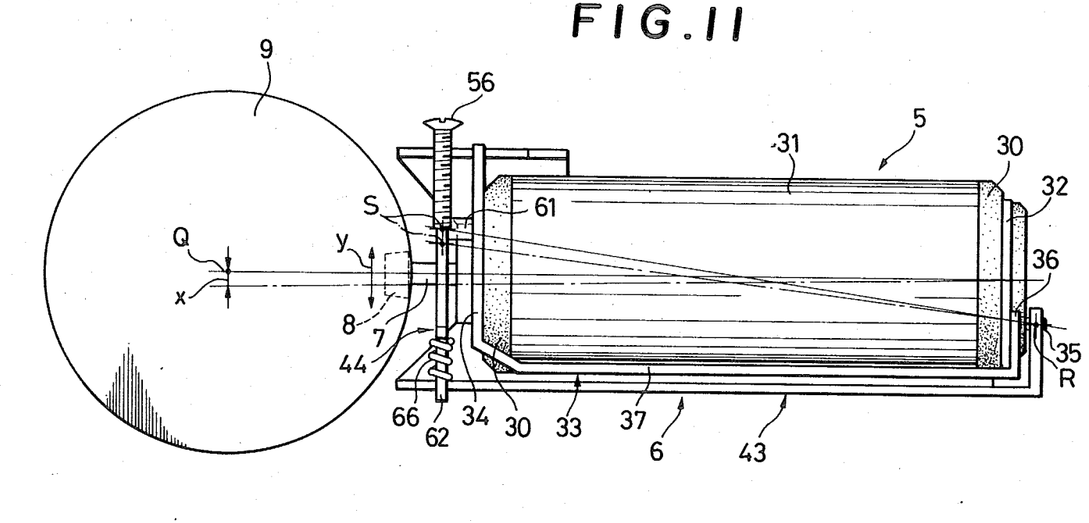
FIG. 11 is a schematic plan view showing the motor support structure so as to explain the fine adjustment mechanism.

The fine-adjustment function of the fine-adjustment mechanism will now be described. As shown in FIG. 7, the adjustment plate 44 of the motor support member 6 is supported such that the arms 62, 64 and 65 are respectively slidably fitted in the elongate holes 53a, 64 and 65 of the fixing member 43, as previously described. The adjusting screw 56 is used to adjust the motor support member 6 to be substantially horizontal in the right-left direction (y-direction). On the other hand, the motor 5 is pivotally supported together with the motor mounting member 33 by the adjustment plate 44 by means of the pin 61 fixed on the adjustment plate 44. Therefore, when the adjustment plate 44 is slightly moved from the position indicated by the solid line to the right-hand position indicated by the alternate long and short dashed line in FIG. 7 (and FIG. 11,) the fixing pin 61 is horizontally moved to the right by an amount for fine adjustment. As previously mentioned, the motor 5 is supported by the fixing pins 35 and 61, and the rear side fixing pin 35 will not move. When the support point S of the front side fixing pin 61 is moved, the motor 5 is pivoted about the support point R of the rear side fixing pin 35. Therefore, the axis of the motor is also pivoted by this amount. For example, the axis is deviated by x from the center Q of the capstan pulley 9. In other words, the motor pulley 8 is set at a deviated position. The motor pulley 8 is moved along the right-left direction by means of the adjusting screw 56 while the magnetic tape travels and the reading of the measuring equipment is observed, thereby the motor pulley 8 can be set at a position where a wow and flutter value becomes minimum.

In the capstan friction drive apparatus of a tape recorder according to the present invention as described above, even if the initial contact pressure between the friction wheel and the flywheel is minimized, the friction wheel is urged against the contact surface upon starting of the apparatus. The contact pressure is increased, so that the rotational force corresponding to the load of the flywheel can be transmitted. In the stop mode, the initial contact pressure as a minimum contact pressure is restored. Even if the apparatus is not used for a long period of time, the friction surface made of rubber will not deform over time due to the contact pressure, thereby preventing local recessing of the friction surface. Therefore, the capstan friction drive apparatus of the present invention reduces irregular rotation, noise and vibrator and can be suitable for delicate tape recorder driving.

According to the motor support mechanism of the present invention, the motor is pivotally supported through the pair of support members (pivot pins) respectively located in front of and behind the motor so as to provide the contact pressure between the friction wheel and the flywheel. However, the motor will not pivot about the pair of support members even if its self-weight acts thereon. The self-weight of the motor will not influence the contact pressure. The contact pressure can be held to be a predetermined pressure irrespective of an orientation of the tape recorder. As a result, a high-performance, high-reliability tape recorder can be obtained.

I claim:

1. A friction drive apparatus for a tape recorder comprising
    a flywheel,
    a capstan mounted on said flywheel,
    a motor,
    a friction wheel mounted on a rotary shaft of said motor and being adapted to be brouoht into slidable contact with said flywheel on which said capstan is mounted for transmitting a rotational force to the flywheel,
    a support mechanism for pivotally supporting said friction wheel about a pivot point which is eccentric with respect to said rotary shaft on which the friction wheel is mounted, and
  biasing means for pivotally biasing said friction wheel about said pivot point toward a contact surface of the flywheel, said biasing means being adapted to apply a predetermined initial contact pressure between said friction wheel and flywheel, and the direction of rotation of the friction wheel being determined such that a reaction force at said contact surface occurring upon rotation of the friction wheel acts in a direction which causes pivotal movement of the friction wheel in the same sense in which the biasing means acts, thereby increasing the contact pressure between the friction wheel and the flywheel above said initial contact pressure,
    said support mechanism for pivotally supporting said motor including a pair of support members which are respectively disposed at opposite axial ends of said motor, so as thereby to support the friction wheel, the pair of support members being disposed at symmetrically eccentric positions with respect to the axial rotary shaft of the motor, and said pair of support members being arranged such that a line passing therethrough also passes substantially through the axial centre of gravity of the motor, whereby contact pressure between said friction wheel and said flywheel is independent of the weight of the motor.

2. A friction drive apparatus according to claim 1, in which said friction wheel has a leveled surface contacting said flywheel.

3. A friction drive apparatus according to claim 1, in which said support mechanism comprises a metal bracket assembly having at least two separable elements and said support members comprise first and second pins arranged in respective holes in said bracket assembly for affixing said separable elements, one to another.

4. A friction drive apparatus according to claim 3, further comprising rubber mounting means for resiliently mounting said motor to one of said two separable elements.

5. A friction drive apparatus according to claim 4, further comprising position adjusting means interposed between said two separable elements mutually affixed by said first and second pins for adjusting the axial alignment of said motor in one of said two separable elements.

6. A friction drive apparatus according to claim 5, in which said position adjusting means includes a threaded element threadedly engaged on one of two separable elements and contacting the other of said separable elements and second biasing means for maintaining said other elements in contact with said threaded element.

* * * * *